United States Patent
Li et al.

(10) Patent No.: US 12,142,200 B2
(45) Date of Patent: Nov. 12, 2024

(54) MULTI-LAYER DISPLAY MODULE

(71) Applicant: PlayNitride Display Co., Ltd., MiaoLi County (TW)

(72) Inventors: Yun-Li Li, MiaoLi County (TW); Kuan-Yung Liao, MiaoLi County (TW); Sheng-Yuan Sun, MiaoLi County (TW); Zong Huei Tsai, MiaoLi County (TW)

(73) Assignee: PlayNitride Display Co., Ltd., Miaoli County (TW)

( * ) Notice: Subject to any disclaimer, the term of this patent is extended or adjusted under 35 U.S.C. 154(b) by 0 days.

(21) Appl. No.: 18/389,791

(22) Filed: Dec. 20, 2023

(65) Prior Publication Data
US 2024/0346982 A1    Oct. 17, 2024

Related U.S. Application Data

(60) Provisional application No. 63/459,252, filed on Apr. 13, 2023.

(51) Int. Cl.
*G09G 3/30* (2006.01)
*G06F 3/01* (2006.01)
*G09G 3/32* (2016.01)

(52) U.S. Cl.
CPC .............. *G09G 3/32* (2013.01); *G06F 3/013* (2013.01); *G09G 2300/023* (2013.01); *G09G 2320/0626* (2013.01); *G09G 2354/00* (2013.01)

(58) Field of Classification Search
CPC .............. G09G 3/32; G09G 2300/023; G09G 2320/0626; G09G 2354/00; G06F 3/013
See application file for complete search history.

(56) References Cited

U.S. PATENT DOCUMENTS

| | | |
|---|---|---|
| 10,237,538 B2 | 3/2019 | Wang et al. |
| 11,398,461 B2 | 7/2022 | Shin et al. |

(Continued)

FOREIGN PATENT DOCUMENTS

| | | |
|---|---|---|
| CN | 108107623 | 6/2018 |
| CN | 110018573 | 7/2019 |

(Continued)

OTHER PUBLICATIONS

"Office Action of U.S. Related Application, U.S. Appl. No. 18/389,782", issued on Aug. 16, 2024, p. 1-p. 13.

(Continued)

*Primary Examiner* — Sanghyuk Park
(74) *Attorney, Agent, or Firm* — JCIPRNET

(57) ABSTRACT

A multi-layer display module includes a first display panel, a second display panel, a driving device, and an image composition control unit. The second display panel is located beside the first display panel and overlaps the first display panel. The first display panel and the second display panel have an interval therebetween. The driving device is configured to simultaneously provide image signals to the first display panel and the second display panel. An object image displayed in the first display panel is a first object image. An object image displayed in the second display panel is a second object image. The image composition control unit is configured to increase a size of the first object image displayed on the first display panel or decrease a size of the second object image displayed on the second display panel according to information of a relative position of an outside viewer.

20 Claims, 9 Drawing Sheets

(56) References Cited

U.S. PATENT DOCUMENTS

| | | | |
|---|---|---|---|
| 2007/0008240 A1* | 1/2007 | Kurahashi | G02B 30/52 348/E13.057 |
| 2012/0327082 A1* | 12/2012 | Kim | G02B 30/52 345/419 |
| 2015/0373793 A1 | 12/2015 | Bower et al. | |
| 2018/0284470 A1 | 10/2018 | Yamamoto et al. | |
| 2019/0149810 A1 | 5/2019 | Kim | |
| 2019/0355330 A1 | 11/2019 | Lin et al. | |
| 2022/0247988 A1 | 8/2022 | Lu | |
| 2024/0212586 A1 | 6/2024 | Lee et al. | |

FOREIGN PATENT DOCUMENTS

| | | |
|---|---|---|
| TW | 1763321 | 5/2022 |
| WO | 2018004170 | 1/2018 |

OTHER PUBLICATIONS

"Office Action of Taiwan Related Application, Application No. 112149779", issued on Aug. 22, 2024, p. 1-p. 5.
"Office Action of U.S. Related Application, U.S. Appl. No. 18/389,778", issued on Aug. 28, 2024, p. 1-p. 15.
"Office Action of Taiwan Related Application No. 112149776", issued on May 21, 2024, pp. 1-8.

* cited by examiner

MULTI-LAYER DISPLAY MODULE

CROSS-REFERENCE TO RELATED APPLICATION

This application claims the priority benefits of U.S. provisional application Ser. No. 63/459,252, filed on Apr. 13, 2023. The entirety of the above-mentioned patent application is hereby incorporated by reference herein.

BACKGROUND OF THE DISCLOSURE

Field of the Disclosure

The present invention relates to a display module, and particularly to a multi-layer display module.

Description of Related Art

With the advancement of display technology, displays have evolved from traditional, thick cathode ray tubes (CRT) to thinner and lighter liquid crystal displays, and then to self-luminous organic light-emitting diodes (OLED) displays and micro light-emitting diode (micro-LED) displays. In addition, transparent displays have also been developed.

When a transparent display with good display quality is developed, it can bring new experiences and applications to users, for example, it can form a multi-layer display. However, there are still some issues to be overcome and solved in the matching of display effects of each layer of the multi-layer display.

SUMMARY OF THE DISCLOSURE

The present invention provides a multi-layer display module with natural dynamic display effects.

An embodiment of the present invention provides a multi-layer display module, which includes a first display panel, a second display panel, a driving device and an image composition control unit. The second display panel is located on one side of the first display panel and overlapped with the first display panel, and includes a plurality of display pixels and light-transmitting areas located between the plurality of display pixels. Each display pixel includes a plurality of micro light-emitting diodes, wherein there is a space between the first display panel and the second display panel. The driving device is configured to simultaneously provide image signals to the first display panel and the second display panel to display the first image and the second image respectively, and to provide object image signals to the first display panel or the second display panel to display the object image. The object image displayed on the first display panel is the first object image, and the object image displayed on the second display panel is the second object image. The first image forms a viewing screen with the second image and the object image through the light-transmitting areas. The image composition control unit is configured to calculate a first distance from an external viewer to the first display panel and a second distance from the external viewer to the second display panel respectively based on relative position information of the external viewer. Increasing dimension of the first object image displayed on the first display panel or reducing dimension of the second object image displayed on the second display panel make the external viewer have the same viewing angle for the first object image and the second object image according to the first distance and the second distance.

In the embodiment of the multi-layer display module of the present invention, increasing dimension of the first object image displayed on the first display panel or reducing dimension of the second object image displayed on the second display panel make the external viewer have the same viewing angle for the first object image and the second object image according to the first distance from the external viewer to the first display panel and the second distance from the external viewer to the second display panel respectively. In this way, when switching between the first display panel and the second display panel, images of the same dimension can be continuously provided to the viewer, and the embodiment of the multi-layer display module of the present invention can have natural dynamic display effects.

DESCRIPTION OF THE EMBODIMENTS

Figure 1A:
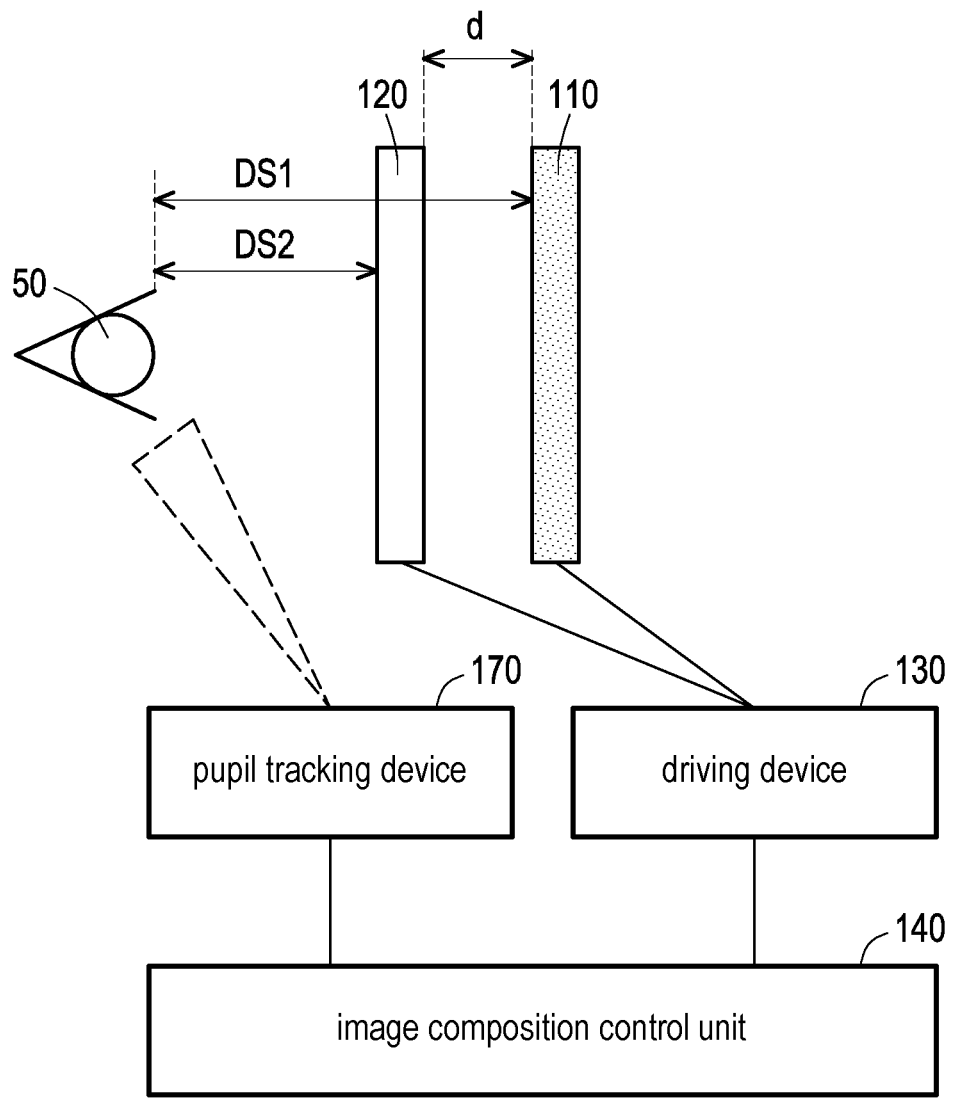
FIG. 1A is a schematic structural diagram of a multi-layer display module according to an embodiment of the present invention.
Figure 1B:
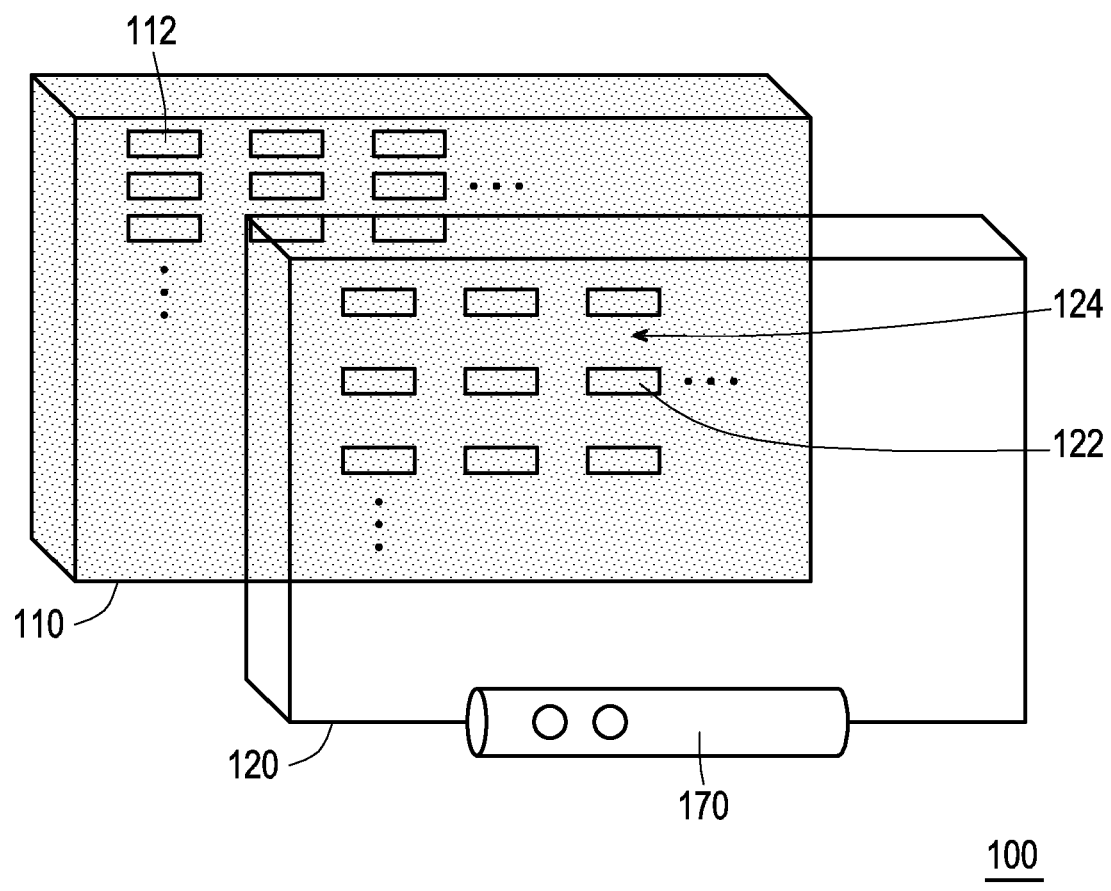
FIG. 1B is a schematic three-dimensional view of the multi-layer display module of FIG. 1A.

FIG. 1A is a schematic structural diagram of a multi-layer display module according to an embodiment of the present invention, and FIG. 1B is a schematic three-dimensional view of the multi-layer display module of FIG. 1A. Please refer to FIG. 1A and FIG. 1B. The multi-layer display module 100 of this embodiment includes a first display panel 110, a second display panel 120 and a driving device 130. The second display panel 120 is located on one side of the first display panel 110 and overlapped with the first display panel 110, and includes the plurality of display pixels 122 and light-transmitting areas 124 located between the display pixels 122.

In this embodiment, the second display panel 120 may further include circuits that are electrically connected to the display pixels 122, the circuits may include scan lines, data lines and some drive circuits, which are well known to those with ordinary knowledge in the field. In order to keep the diagram concise, the plurality of circuits are no longer drawn.

In addition, a space between the first display panel 110 and the second display panel 120 is d. The driving device 130 is configured to simultaneously provide image signals to the first display panel 110 and the second display panel 120 to display the display image of the first display panel 110 and the display image of the second display panel 120 respectively. For example, the driving device 130 is configured to simultaneously provide image signals to the first display panel 110 and the second display panel 120 to display the first image and the second image respectively, and to provide object image signals to the first display panel 110 or the second display panel 120, and display the object image. The object image displayed on the first display panel is the first object image, the object image displayed on the second display panel is the second object image. The first image forms a viewing screen with the second image and the object image through the light-transmitting areas 124. Specifically, in one embodiment, the orthographic projection of the second display panel 120 on the first display panel 110 completely overlaps the first display panel 110, thereby providing a better viewing image.

In this embodiment, the plurality of display pixels 122 include the plurality of micro light-emitting diodes. Micron-level micro light-emitting diodes as display pixels can have better luminance and higher transmittance to allow the first image to pass through. Each display pixel 122 includes at least three micro light-emitting diodes with different light colors.

For example, each display pixel 122 may include a red micro-LED, a green micro-LED, and a blue micro-LED. In addition, in this embodiment, the luminance of the first image is greater than the luminance of the second image. For example, the ratio of the luminance of the first image to the luminance of the second image falls within the range of 1.2 to 2.

In one embodiment, the first display panel 110 can emit a maximum rated luminance of L1, and the second display panel 120 can emit a maximum rated luminance of L2, and L1 is greater than L2. For example, the ratio of L1 to L2 falls within the range of 1.2 to 2.

In this embodiment, the first image is a background image, and the second image is a main image. Since a space between the first display panel 110 and the second display panel 120 is d, the second image (main image) appears in front of the first image (background image), which has an effect similar to a three-dimensional display.

In some embodiments, the luminance of the main image is greater than the luminance of the background image, so that the main image can be more eye-catching to an external viewer 50 to achieve a three-dimensional visual effect of the front and rear images.

In this embodiment, the resolution of the second image is smaller than or equal to the resolution of the first image, and thus it is easier for the external viewer 50 to distinguish the first image from the second image, thereby achieving a better stereoscopic display effect.

In one embodiment, the luminance of the first image is controlled by a voltage signal, and the luminance of the second image is driven by a current signal. For example, the first display panel 110 is a liquid crystal display, which controls luminance by the voltage signal, and the second display panel 120 is a micro light-emitting diode display, whose micro light-emitting diodes can be driven by the current signal which precisely controls the presentation of main image.

In this embodiment, the transmittance of the second display panel 120 is greater than the transmittance of the first display panel 110. In this way, it is easier for the external viewer 50 to view the first image displayed by the first display panel 110 through the second display panel 120.

Figure 2:
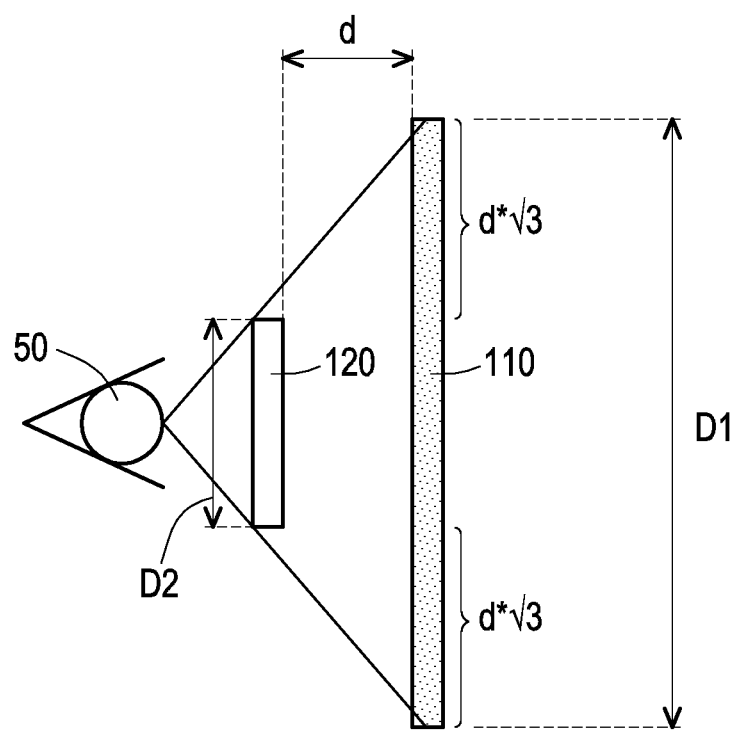
FIG. 2 is a schematic structural diagram of a multi-layer display module according to another embodiment of the present invention.

FIG. 2 is a schematic structural diagram of a multi-layer display module according to another embodiment of the present invention. In another embodiment, please refer to FIG. 2, the dimension of the first display panel 110 is larger than the dimension of the second display panel 120.

For example, the dimension of the long side of the first display panel 110 is D1, the dimension of the long side of the second display panel 120 is D2, the space between the first display panel 110 and the second display panel 120 is d, and the multi-layer display module 100a complies with $D1-D2 \geq 2*\sqrt{3}*d$. In this way, the external viewer 50 can view the first image displayed by the first display panel 110 through the second display panel 120 at any angle under the 120° angle of view.

In one embodiment, D1 is the dimension of the long side of the display area of the first display panel 110, and D2 is the dimension of the long side of the display area of the second display panel 120. In this embodiment, the luminous opening angles of the display pixels 122 of the second display panel 120 are larger than the luminous opening angles of the display pixels 112 of the first display panel 110. The smaller luminous opening angles of the first display panel 110 helps the light energy to be concentrated and to penetrate effectively the second display panel 120 for observation by the external viewer 50. The smaller luminous opening angles of the first display panel 110 can reduce the large-angle ineffective light transmitting to the side wall and avoid wasting light energy.

Figure 3A:
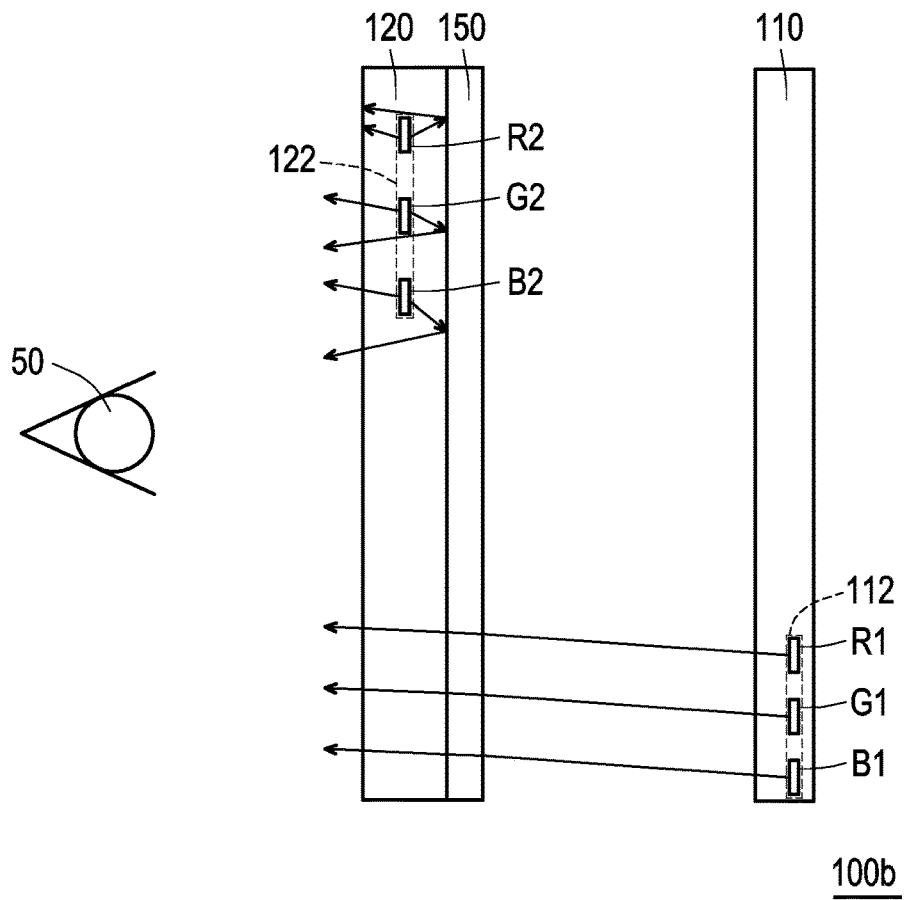
FIG. 3A is a schematic structural diagram of a multi-layer display module according to another embodiment of the present invention.
Figure 3B:
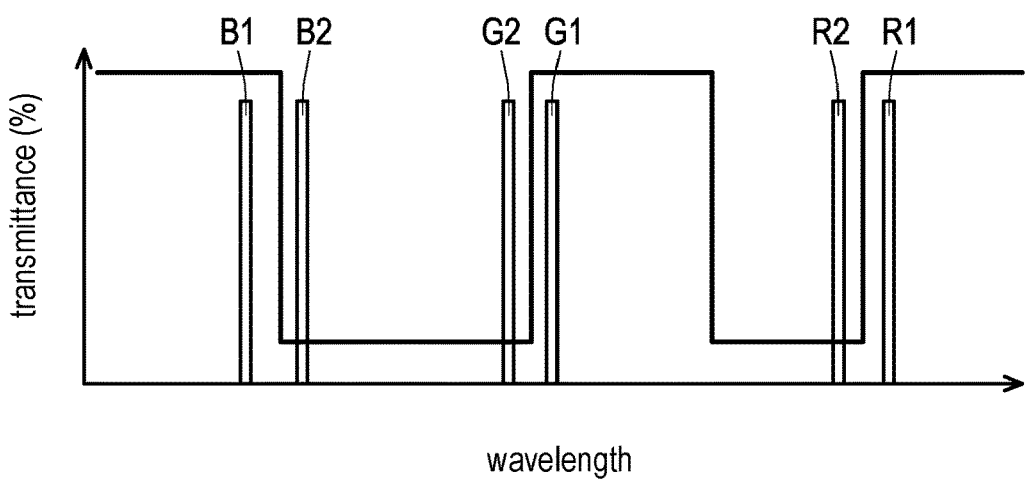
FIG. 3B is a schematic diagram of the transmission spectrum of the optical film in FIG. 3A and the peak wavelength of the light emitted by the sub-pixels of each color.

FIG. 3A is a schematic structural diagram of a multi-layer display module according to another embodiment of the present invention, and FIG. 3B is a schematic diagram of the transmission spectrum of the optical film and the peak wavelengths of light emitted by sub-pixels of various colors in FIG. 3A. In another embodiment, please refer to FIG. 3A and FIG. 3B. The multi-layer display module 100b further includes an optical film 150, which is disposed between the first display panel 110 and the second display panel 120. The optical film 150 has high reflectivity for light emitted by the second display panel 120. For example, the reflectivity is greater than or equal to 90%. In addition, in this embodiment, the optical film 150 has high transmittance for light emitted by the first display panel 110, and the transmittance is, for example, greater than or equal to 90%.

Specifically, in this embodiment, the plurality of display pixels 112 of the first display panel 110 have a plurality of first sub-pixels, and the plurality of display pixels 122 of the second display panel 120 have a plurality of second sub-pixels, a peak wavelength of the same color light emitted by the first sub-pixel and a peak wavelength of the same color light emitted by the second sub-pixel are different. High transmittance of wavelength range of the optical film 150 corresponds to each wavelength of the plurality of first sub-pixels of the first display panel 110, and high reflectivity of wavelength range of the optical film 150 corresponds to each wavelength of the plurality of the second sub-pixels of the second display panel 120.

In this embodiment, each display pixel 122 of the second display panel 120 may include a red sub-pixel R2, a green sub-pixel G2 and a blue sub-pixel B2 (the plurality of sub-pixels are second sub-pixels). Each display pixel 112 of the first display panel 110 may include a red sub-pixel R1, a green sub-pixel G1, and a blue sub-pixel B1 (the plurality of sub-pixels are first sub-pixels).

In one embodiment, the peak wavelength of the red sub-pixel R1 is, for example, 630 nm. The peak wavelength of the red sub-pixel R2 is, for example, 610 nm. The peak wavelength of the green sub-pixel G1 is, for example, 540 nm. The peak wavelength of the green sub-pixel G2 is, for example, 520 nm. The peak wavelength of the blue sub-pixel B1 is, for example, 440 nm. The peak wavelength of the blue sub-pixel B2 is, for example, 460 nm. As shown in FIG. 3B, the optical film 150 has high transmittance, that is, low reflectivity, for light emitted by the red sub-pixel R1, the green sub-pixel G1 and the blue sub-pixel B1 of the first display panel 110, and the optical film 150 has low transmittance, that is, high reflectivity for light emitted by the red sub-pixel R2, the green sub-pixel G2 and the blue sub-pixel B2 of the second display panel 120.

Figure 4:
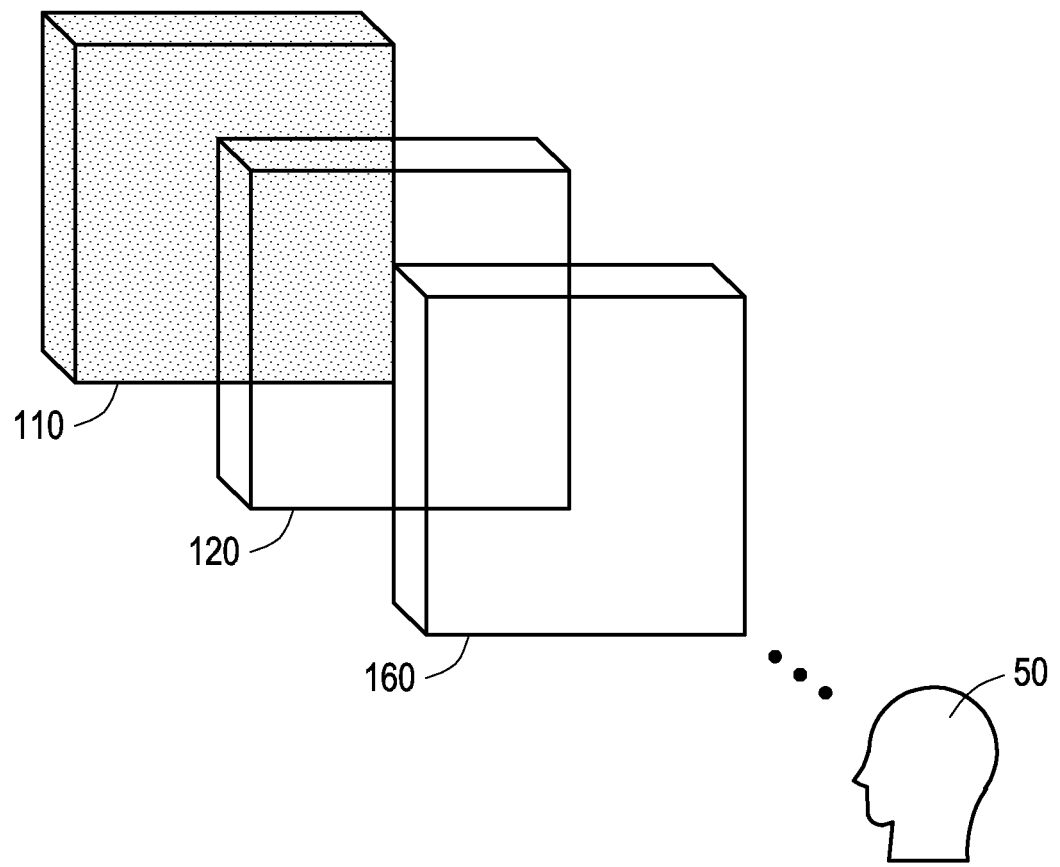
FIG. 4 is a schematic three-dimensional view of a multi-layer display module according to another embodiment of the present invention.

FIG. 4 is a schematic three-dimensional view of a multi-layer display module according to another embodiment of the present invention. In another embodiment, please refer to FIG. 4, the multi-layer display module 100c includes a third display panel 160 located on one side of the second display panel 120 away from the first display panel 110. In this embodiment, the first display panel 110, the second display panel 120, and the third display panel 160 are arranged in sequence with gaps between them toward the eyes of the external viewer 50.

In this embodiment, the transmittance of the third display panel 160 is greater than the transmittance of the second display panel 120, and the luminance of the second display panel 120 is greater than the luminance of the third display panel 160. In one embodiment, the transmittance of the third display panel is greater than 50%. The present invention does not limit the number of display panels to two or three. In other embodiments, there can also be more than four display panels arranged in sequence with gaps between them toward the eyes of the external viewer 50. The closer the display panel to the external viewer 50 is, the greater the transmittance of the display panel is, so as to have a better display effect.

Please refer to FIG. 1A and FIG. 1B again. In this embodiment, the multi-layer display module 100 further includes an image composition control unit 140. The image composition control unit 140 is configured to calculate the first distance DS1 from an external viewer 50 to the first display panel 110 and second distance DS2 from the external viewer 50 to the second display panel 120 respectively based on relative position information of the external viewer 50. Increasing (for example, increasing proportionally) dimension of the first object image displayed on the first display panel 110 or reducing (for example, reducing proportionally) dimension of the second object image displayed on the second display panel 120 make the external viewer 50 have the same viewing angle for the first object image and the second object image according to the first distance DS1 and the second distance DS2.

Figure 5A:
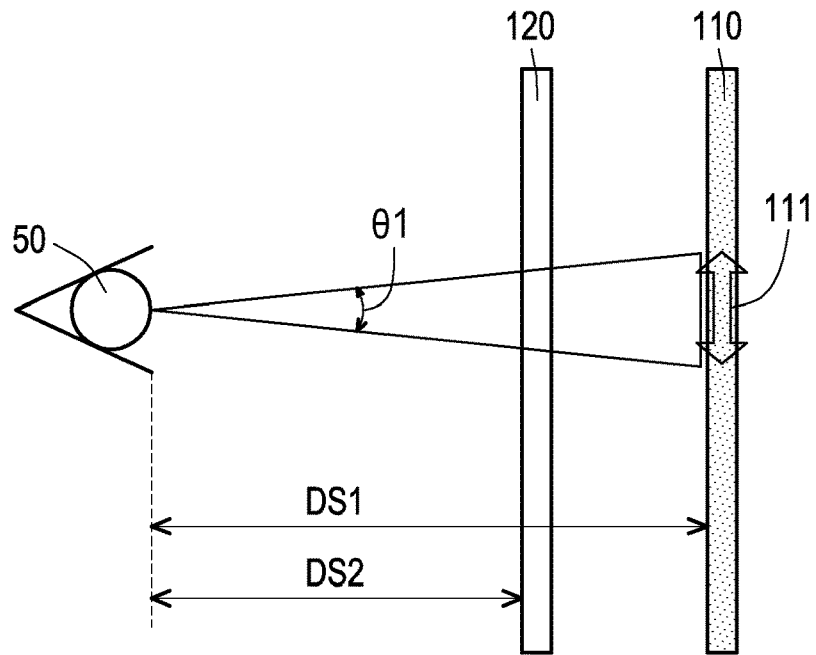
FIGS. 5A and 5B are schematic cross-sectional views of a first display panel displaying a first object image and a second display panel displaying a second object image in a comparative embodiment.
Figure 5B:
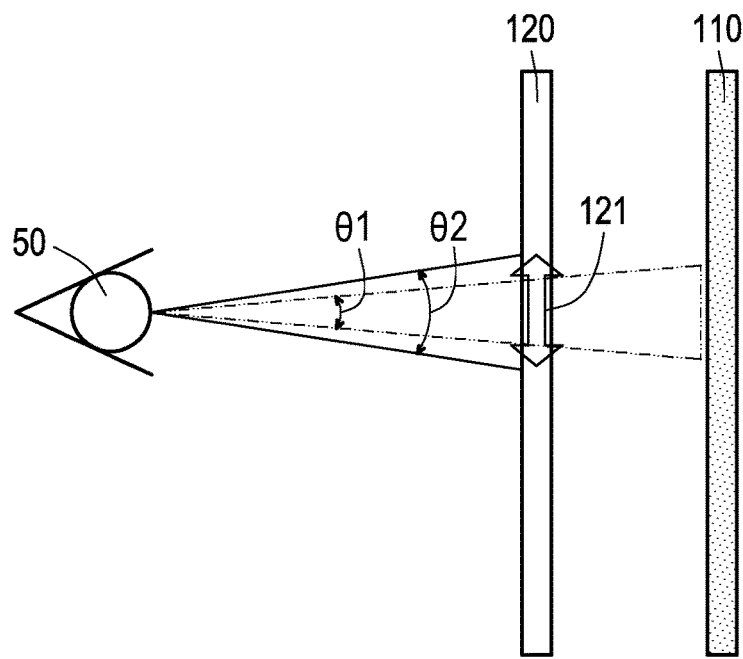

For example, as shown in FIG. 5A, if a first object image 111 is originally displayed on the first display panel 110, the dimension of first object image 111 generates a viewing angle θ1 for the eyes of the external viewer 50. When the multi-layer display module creates the effect that the object image is closer to the external viewer 50, the object image can be switched from the first display panel 110 to the second display panel 120, that is, the second display panel 120 is configured to display the second object image 121 the same as the first object image 111, as shown in FIG. 5B.

However, since the dimension of the first object image 111 is the same as the dimension of the second object image 121 and the second object image 121 is closer to the eyes of the external viewer 50, the second object image 121 will give a larger angle view angle θ2 to the eyes of the external viewer 50 (where θ2>θ1). As a result, when the object image switches from the first display panel 110 to the second display panel 120, the external viewer 50 suddenly feel the object image becoming larger, and the dynamic display effect of the multi-layer display module unnatural.

Figure 6:
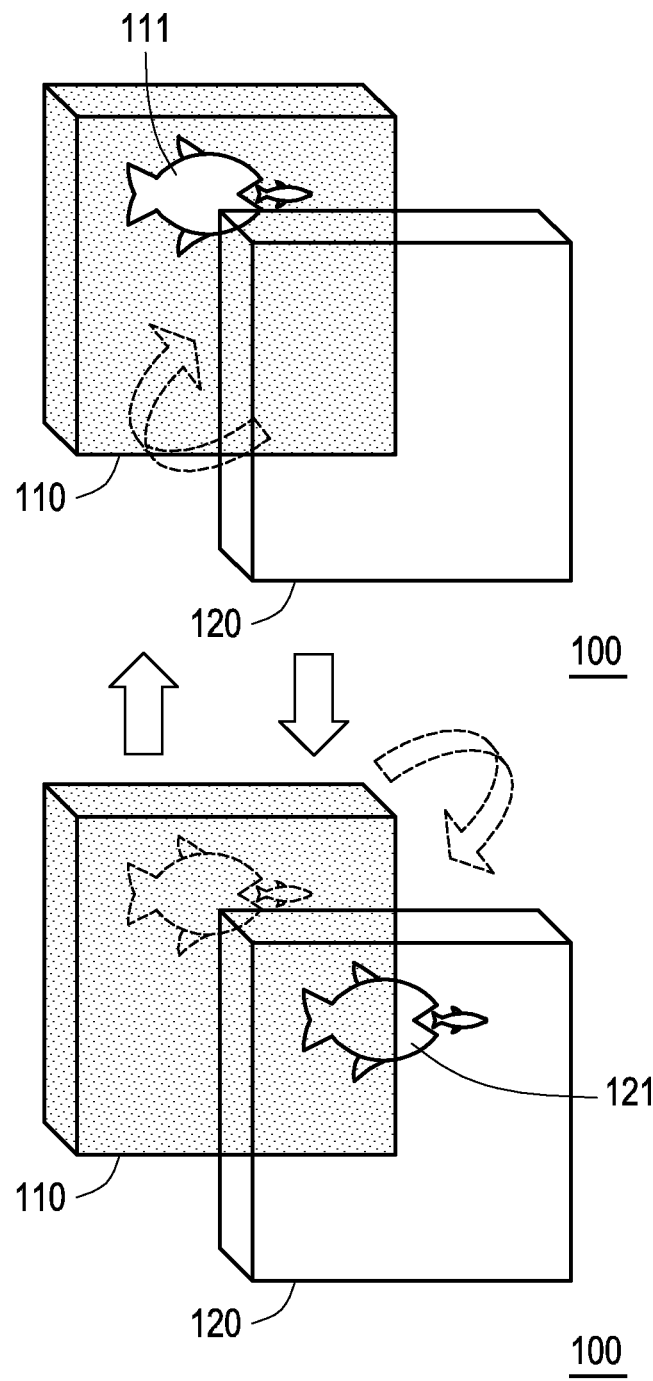
FIG. 6 is a three-dimensional schematic diagram of the multi-layer display module in FIG. 1A switching between the first display panel displaying the first object image and the second display panel displaying the second object image.

Therefore, in this embodiment, as shown in FIG. 6, in case 1, the first object image 111 can be displayed on the first display panel 110, and then the image composition control unit 140 can reduce the dimension of the second object image 121 displayed on the second display panel 120 based on the position of the external viewer 50 (such as the above-mentioned first distance DS1 and second distance DS2) to obtain the same viewing angle as the first object image 111 when a state of the first object image 111 displayed on the first display panel 110 is switched to a state of the second object image 121 displayed on the second display panel 120.

The first object image 111 and the second object image 121 are corresponding images. In this way, when the object image switches from the first display panel 110 to the second display panel 120, the external viewer 50 will not suddenly feel that the object image becoming larger. Instead, the external viewer 50 will feel that the multi-layer display module 100 of this embodiment has natural dynamic display effect.

In addition, in case 2, the second object image 121 can also be displayed on the second display panel 120, and then the image composition control unit 140 can increase the dimension of the first object image 111 displayed on the first display panel 110 based on the position of the external viewer 50 (such as the above-mentioned first distance DS1 and second distance DS2) to obtain the same viewing angle as the second object image 121 when a state of the second object image 121 displayed on the second display panel 120 is switched to a state of the first object image 111 displayed on the first display panel 110.

In this way, when the object image switches from the second display panel 120 to the first display panel 110, the external viewer 50 will not suddenly feel that the object image becoming smaller. Instead, the external viewer 50 will feel that the multi-layer display module 100 of this embodiment has natural dynamic display effect.

In one embodiment, the image composition control unit 140 gradually changes the dimension of the first object image 111 displayed on the first display panel 110 or the dimension of the second object image 121 displayed on the second display panel 120 respectively so that the external viewer 50 has the same viewing angle for the first object image 111 and the second object image 121.

In another embodiment, in case 1, after switching the state of the first object image 111 displayed on the first display panel 110 to the state of the second object image 121 displayed on the second display panel 120, the image composition control unit 140 can increase gradually the dimension of the second object image 121 displayed on the second display panel 120, giving the external viewer 50 a gradually increasing viewing angle for the second object image 121 and an visual effect that the second object image 121 is getting closer and closer to the external viewer 50.

In addition, in another embodiment, in case 2, after switching the state of the second object image 121 displayed on the second display panel 120 to the state of the first object image 111 displayed on the first display panel 110, the image composition control unit 140 can reduce gradually the dimension of the first object image 111 displayed on the first display panel 110, giving the external viewer 50 a gradually reducing viewing angle for the first object image 111 and an visual effect that the first object image 111 is getting farther and farther away from the external viewer 50.

In another embodiment, in case 1, before switching the state of the first object image 111 displayed on the first display panel 110 to the state of the second object image 121 displayed on the second display panel 120, the image composition control unit 140 can increase gradually the dimension of the first object image 111 displayed on the first display panel 110, giving the external viewer 50 a gradually increasing viewing angle for the first object image 111 and an visual effect that the first object image 111 is getting closer and closer to the external viewer 50.

In another embodiment, in case 2, before switching the state of the second object image 121 displayed on the second display panel 120 to the state of the first object image 111 displayed on the first display panel 110, the image composition control unit 140 can reduce gradually the dimension of the second object image 121 displayed on the second display panel 120, giving the external viewer 50 a gradually reducing viewing angle for the second object image 121 and an visual effect that the second object image 121 is getting farther and farther away from the external viewer 50.

In another embodiment, in case 1, before switching the state of the first object image 111 displayed on the first display panel 110 to the state of the second object image 121 displayed on the second display panel 120, the image composition control unit 140 can increase gradually the dimension of the first object image 111 displayed on the first display panel 110, and in case 1, after switching the state of the first object image 111 displayed on the first display panel 110 to the state of the second object image 121 displayed on the second display panel 120, the image composition control unit 140 can increase gradually the dimension of the second object image 121 displayed on the second display panel 120, giving the external viewer 50 a continuously and gradually increasing viewing angle for the first object image 111 and the second object image 121 and an visual effect that the object image is getting closer and closer to the external viewer 50.

In another embodiment, in case 2, before switching the state of the second object image 121 displayed on the second display panel 120 to the state of the first object image 111 displayed on the first display panel 110, the image composition control unit 140 can reduce gradually the dimension of the second object image 121 displayed on the second display panel 120, and in case 2, after switching the state of the second object image 121 displayed on the second display panel 120 to the state of the first object image 111 displayed on the first display panel 110, the image composition control unit 140 can reduce gradually the dimension of the first object image 111 displayed on the first display panel 110, giving the external viewer 50 a gradually reducing viewing angle for the first object image 111 and the second object image 121 and an visual effect that the object image is getting farther and farther away from the external viewer 50.

As described in the above embodiments, the multi-layer display module 100 can provide natural dynamic display effects. In this embodiment, the multi-layer display module 100 further includes a pupil tracking device 170 is config- ured to measure the relative position information between the external viewer 50 and the multi-layer display module 100 and provide the relative position information to the image composition control unit 140.

The pupil tracking device 170 may include a camera, an image sensor, a distance sensor, or any suitable position sensor. In the multi-layer display modules 100d, 100e and 100f of FIGS. 7A, 7B and 7C, the pupil tracking device includes sensing elements 172 embedded between the plurality of the display pixels 112 in the first display panel 110 and sensing elements 174, 174a, or 174b embedded between the plurality of the display pixels 122 in the second display panel 120.

Figure 7A:
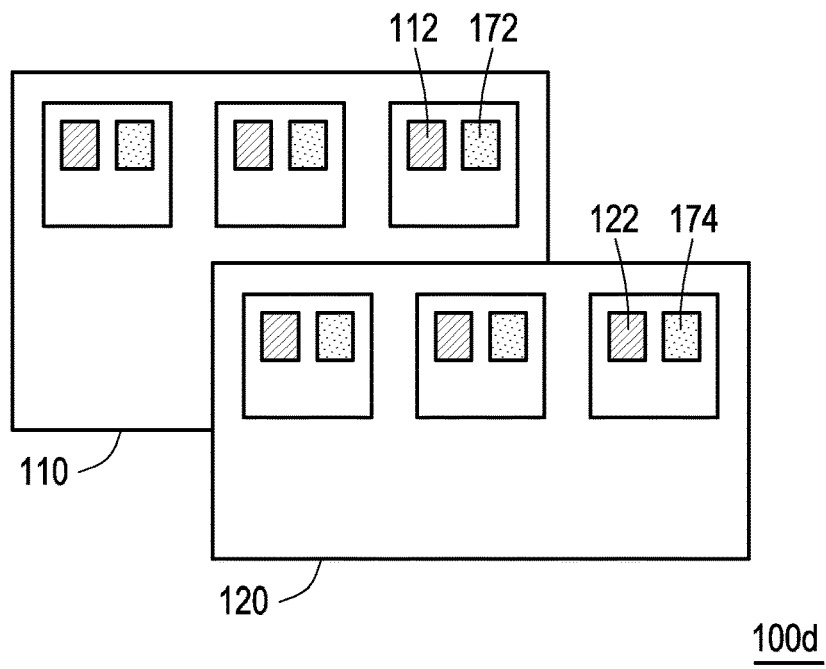
FIGS. 7A, 7B and 7C are schematic diagrams of multi-layer display modules and sensing elements therein according to other three embodiments of the present invention.

For example, in FIG. 7A of the multi-layer display module 100d, the sensing elements 172 and the sensing elements 174 are disposed on the first display panel 110 and the second display panel 120, respectively. The sensing elements 172 and the display pixels 112 are arranged alternatively, and the sensing elements 174 and the display pixels 122 are arranged alternatively.

Figure 7B:
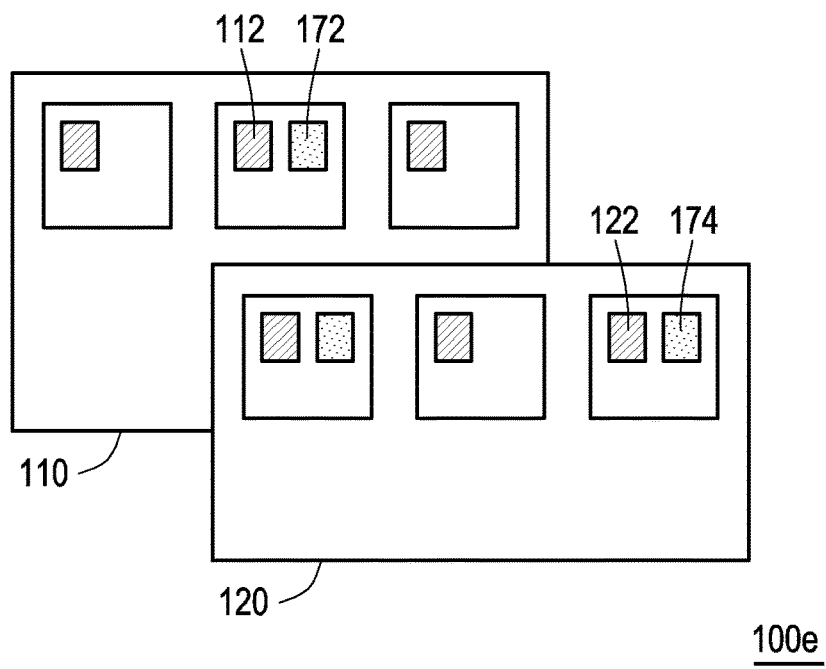

In FIG. 7B of the multi-layer display module 100e, the sensing element 172 may appear once at least every two display pixels 112, and the sensing element 174 may appear once every at least two display pixels 122.

Figure 7C:
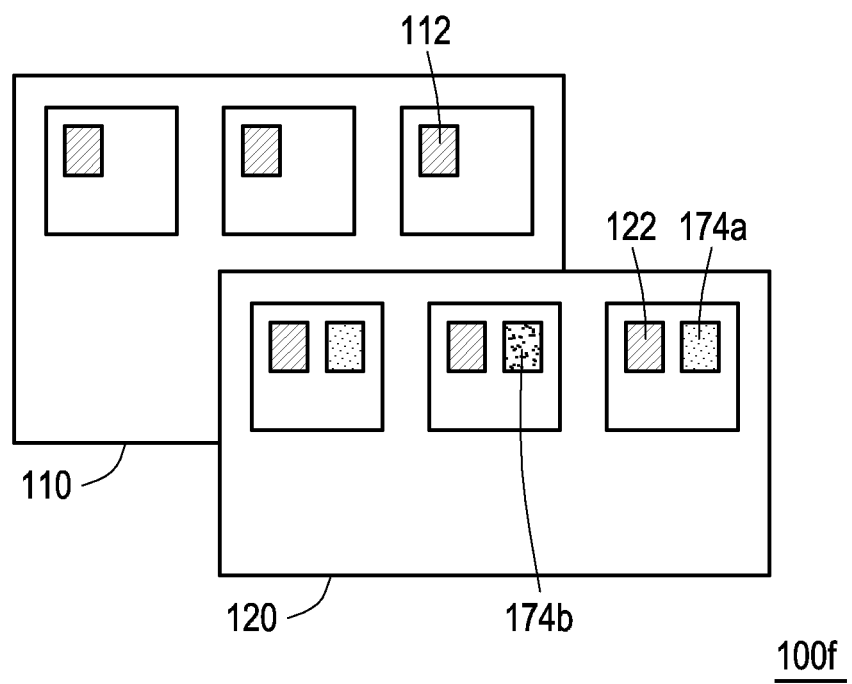

In FIG. 7C of the multi-layer display module 100f, the sensing elements can be divided into two groups, which are respectively composed of sensing elements 174a and 174b. These two groups can sense different eyeballs respectively. The sensing elements 172, 174, 174a or 174b are, for example, sensing pixels, which may include photodiodes.

Please refer to FIG. 1A and FIG. 1B. In this embodiment, the driving device 130 includes an image database. Image data in the image database has the first frame and the second frame listed in the same time sequence. the driving device 130 converts the first frame and the second frame into the image signals after decoding and after the first display panel 110 and the second display panel 120 are provided, the first display panel 110 and the second display panel 120 are played synchronously based on timing sequence information included after providing the image signals to the first display panel and the second display panel.

In one embodiment, the transmittance of the second display panel 120 is T2, the luminance of the first display panel 110 is L1, the luminance of the second display panel 120 is L2, and the multi-layer display module 100 complies with T2>40% and $$0.8 \le \frac{L1}{L2*(1-T2)},$$

so as to ensure that the external viewer 50 can have basically sufficient recognition luminance. when viewing the image of the first display panel 110.

In some embodiments, the first display panel 110 emits a maximum rated luminance of L1, and the second display panel 120 emits a maximum rated luminance of L2, and L1 is greater than L2. In one embodiment, the plurality of display pixels 122 include the plurality of micro light-emitting diodes, the luminance of the first display panel 110 is L1, the luminance of the second display panel 120 is L2, the transmittance of the second display panel 120 is T2, and the multi-layer display module 100 complies with $$0.8 \le \frac{L1}{L2*(1-T2)} \le 1.2.$$

When $$\frac{L1}{L2*(1-T2)}$$

is greater than or equal to 0.8, the external viewer 50 will have basically enough recognition luminance to watch the image of the first display panel 110. When $$\frac{L1}{L2*(1-T2)}$$

is less than or equal to 1.2, it can avoid over-correction, causing the first display panel 110 wasting unnecessary energy.

In one embodiment, the plurality of display pixels 122 include the plurality of micro light-emitting diodes, the luminance of the first display panel 110 is L1, the luminance of the second display panel 120 is L2, the transmittance of the second display panel 120 is T2, and the multi-layer display module Group 100 complies with $$0.8 \leq \frac{L1*T2}{L2} \leq 1.2.$$

Such a design allows the external viewer 50 to view the images of the first display panel 110 and the second display panel 120 with relatively consistent image luminance.

In some embodiments, the first display panel 110 emits a maximum rated luminance of L1, and the second display panel 120 emits a maximum rated luminance of L2, and L1 is greater than L2.

Please refer to FIG. 2, in the multi-layer display module 100*a*, the dimension of the long side of the first display panel 110 is D1, and the first display panel 110 has the first pixel resolution P1. The dimension of the long side of the second display panel 120 is D2, and the second display panel 120 has the second pixel resolution P2. The space between the first display panel 110 and the second display panel 120 is d, and the transmittance of the second display panel 120 is T2. The multi-layer display module 100*a* complies with T2>40%, P1≠P2 and $$D2*T2 \geq d \geq \frac{D2}{|P1-P2|*P2}.$$

The second display panel 120 has a transmittance of T2 less than 100%, which will partially block light emitted from the first display panel 110 and cause the image quality of the first display panel 110 to degrade (image quality includes image luminance, sharpness, color saturation, etc.).

In order to maintain sufficient image quality of the first display panel 110, d cannot be too large, that is, the optical path from light emitted by the first display panel 110 to the second display panel 120 should be limited, so that light emitted by the first display panel 110 can transmit toward the external viewer 50 and pass through the second display panel 120 as early as possible, thereby reducing the light staying in the divergent propagation process and avoiding excessive deterioration in image quality. Therefore, it is a better situation to comply with D2*T2≥d.

On the other hand, the pixel resolution P2 of the second display panel 120 is greater than or equal to the pixel resolution P1 of the first display panel 110, wherein pixel resolution P1 and P2 refer to the number of pixels per inch. The larger the pixel resolution P2 is, the denser the number of micro light-emitting diodes per inch in the second display panel 120 is and the better image quality the second display panel 120 can provide, and the closer the viewer can watch at this time.

When the first distance DS1 and the second distance DS2 are both reduced, effect of the depth of field can be achieved with a smaller space d. Therefore, P2 and the space d are approximately inversely proportional to each other. The dimension of the second display panel 120 will affect the viewing distance. Once the viewing distance increases, the first distance DS1 and the second distance DS2 will increase at the same time.

In order to maintain the three-dimensional viewing effect (maintain the depth of field effect between these two), the corresponding space d must also be increased accordingly, which will change the lower limit set by the spacing d. Therefore, the dimension of D2 is approximately proportional to the space d.

When |P1−P2| is becoming smaller, the image display details between the first display panel 110 and the second display panel 120 are becoming more similar, and it is less easy for the human eye to detect the difference between these two. Especially, it is relatively necessary to increase the space d to ensure that the first display panel 110 and the second display panel 120 have different visual depths for viewers to maintain a three-dimensional visual experience when both of these two display panels look very clear. Therefore, |P1−P2| is approximately inversely proportional to d. Based on the above, it is a better situation to comply with $$d \geq \frac{D2}{|P1-P2|*P2}.$$

In one embodiment, the image composition control unit 140 is, for example, a central processing unit (CPU), a microprocessor (microprocessor), a digital signal processor (DSP), a programmable controller, or a programmable controller. The present invention is not limited to programmable logic devices (PLD) or other similar devices or combinations of the plurality of devices.

In addition, in one embodiment, each function of the image composition control unit 140 may be implemented as a plurality of program codes. The plurality of program codes will be stored in a memory, and the image composition control unit 140 will execute the plurality of program codes. Alternatively, in one embodiment, each function of the image composition control unit 140 may be implemented as one or more circuits. The present invention is not limited to using software or hardware to implement each function of the image composition control unit 140.

To sum up, in the embodiment of the multi-layer display module according of the present invention, increasing the dimension of the first object image displayed on the first display panel or reducing the dimension of the second object image displayed on the second display panel make the external viewer have the same viewing angle for the first object image and the second object image according to the first distance from the external viewer to the first display panel and the second distance from the external viewer to the second display panel respectively. In this way, when switching between the first display panel and the second display panel in the embodiment of the multi-layer display module of the present invention, images of the same dimension can be continuously provided to the viewer, and can have natural dynamic display effects.

What is claimed is:

1. A multi-layer display module comprising:
   a first display panel;
   a second display panel, located on one side of the first display panel and overlapped with the first display panel, wherein the second display panel comprises a plurality of display pixels and light-transmitting areas located between the plurality of display pixels, each of the plurality of the display pixels comprises a plurality of micro light-emitting diodes, and there is a space between the first display panel and the second display panel;
   a driving device, configured to simultaneously provide image signals to the first display panel and the second display panel to display a first image and a second image respectively, and to provide object image signals to the first display panel or the second display panel to display object image, wherein the object image displayed on the first display panel is a first object image, and the object image displayed on the second display panel is a second object image, and the first image forms a viewing screen with the second image and the object image through the light-transmitting areas; and
   an image composition control unit, configured to calculate a first distance from an external viewer to the first display panel and a second distance from the external viewer to the second display panel respectively based on relative position information of the external viewer, wherein increasing dimension of the first object image displayed on the first display panel or reducing dimension of the second object image displayed on the second display panel make the external viewer have the same viewing angle for the first object image and the second object image according to the first distance and the second distance.

2. The multi-layer display module according to claim 1 further comprising a pupil tracking device configured to measure the relative position information of the external viewer and the multi-layer display module and provide the relative position information to the image composition control unit.

3. The multi-layer display module according to claim 2, wherein the pupil tracking device comprises sensing elements embedded between a plurality of display pixels in the first display panel or the sensing elements embedded between the plurality of display pixels in the second display panel.

4. The multi-layer display module according to claim 1, wherein when a state of the first object image displayed on the first display panel is to be switched to a state of the second object image displayed on the second display panel, the image composition control unit reduces the dimension of the second object image displayed on the second display panel, and when the state of the second object image displayed on the second display panel is to be switched to the state of the first object image displayed on the first display panel, the image composition control unit increases the dimension of the first object image displayed on the first display panel, so that the external viewer have the same viewing angle for the first object image and the second object image.

5. The multi-layer display module according to claim 1, wherein the image composition control unit respectively increases gradually the dimension of the first object image displayed on the first display panel or reduces gradually the dimension of the second object image displayed on the second display panel, so that the external viewer have the same viewing angle for the first object image and the second object image.

6. The multi-layer display module according to claim 1, wherein the driving device comprises an image database, image data of the image database has a first frame and a second frame listed in the same time sequence, the driving device converts the first frame and the second frame into the image signals after decoding, and the first display panel and the second display panel are played synchronously based on timing sequence information included after providing the image signals to the first display panel and the second display panel.

7. The multi-layer display module according to claim 1, wherein transmittance of the second display panel is T2, luminance of the first display panel is L1, luminance of the second display panel is L2, and the multi-layer display module complies with T2>40% and $$0.8 \leq \frac{L1}{L2*(1-T2)}.$$

8. The multi-layer display module according to claim 1, wherein luminance of the first display panel is L1, luminance of the second display panel is L2, transmittance of the second display panel is T2, and the multi-layer display module complies with $$0.8 \leq \frac{L1}{L2*(1-T2)} \leq 1.2.$$

9. The multi-layer display module according to claim 1, wherein luminance of the first display panel is L1, luminance of the second display panel is L2, transmittance of the second display panel is T2, and the multi-layer display module complies with $$0.8 \leq \frac{L1*T2}{L2} \leq 1.2.$$

10. The multi-layer display module according to claim 1, wherein dimension of long side of the first display panel is D1, the first display panel has first pixel resolution P1, dimension of long side of the second display panel is D2, the second display panel has second pixel resolution P2, the space between the first display panel and the second display panel is d, transmittance of the second display panel is T2, and the multi-layer display module complies with T2>40%, P1≠P2 and $$D2*T2 \geq d \geq \frac{D2}{|P1-P2|*P2}.$$

11. The multi-layer display module according to claim 1, wherein the first display panel emits a maximum rated luminance of L1, the second display panel emits a maximum rated luminance of L2, and L1 is greater than L2.

12. The multi-layer display module according to claim 11, wherein a ratio of L1 to L2 falls within a range of 1.2 to 2.

13. The multi-layer display module according to claim 11, wherein pixel resolution of the second display panel is greater than or equal to pixel resolution of the first display panel.

14. The multi-layer display module according to claim 11, wherein luminance of the first image is controlled by a voltage signal, and luminance of the second image is driven by a current signal.

15. The multi-layer display module according to claim 1, wherein dimension of long side of the first display panel is D1, dimension of long side of the second display panel is D2, the space between the first display panel and the second display panel is d, and the multi-layer display module complies with $D1-D2 \geq 2*\sqrt{3}*d$.

16. The multi-layer display module according to claim 1, wherein luminous opening angles of the plurality of the display pixels of the second display panel are greater than luminous opening angles of a plurality of the display pixels of the first display panel.

17. The multi-layer display module according to claim 1 further comprising an optical film disposed between the first display panel and the second display panel, wherein the optical film has reflectivity greater than or equal to 90% for light emitted by the second display panel, or the optical film has transmittance greater than or equal to 90% for light emitted by the first display panel.

18. The multi-layer display module according to claim 17, wherein a plurality of display pixels of the first display panel have a plurality of first sub-pixels, the plurality of display pixels of the second display panel have a plurality of second sub-pixels, and a peak wavelength of the same color light emitted by the first sub-pixel and a peak wavelength of the same color light emitted by the second sub-pixel are different.

19. The multi-layer display module according to claim 18, wherein high transmittance of wavelength range of the optical film corresponds to each wavelength of the plurality of first sub-pixels of the first display panel, and high reflectivity of wavelength range of the optical film corresponds to each wavelength of the plurality of the second sub-pixels of the second display panel.

20. The multi-layer display module according to claim 1 further comprising a third display panel located on one side of the second display panel away from the first display panel, wherein transmittance of the third display panel is greater than transmittance of the second display panel, and luminance of the second display panel is greater than luminance of the third display panel.

* * * * *